June 4, 1957     L. M. DORMAN     2,794,227
SEPARATING END FOR EXTRUDED FASTENER
Filed April 28, 1953
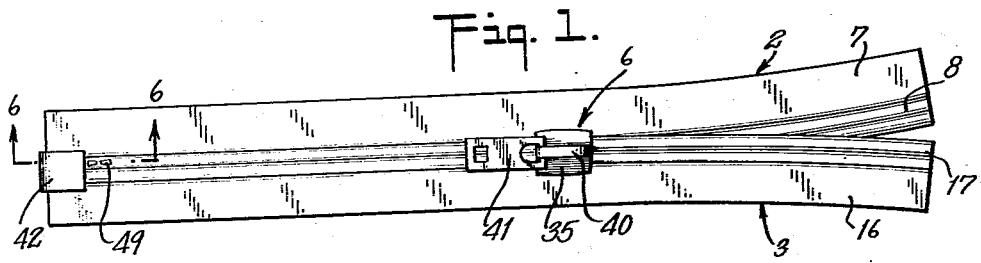
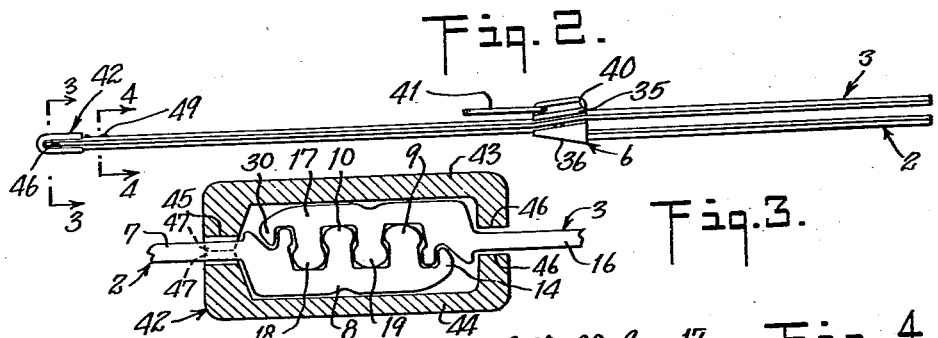
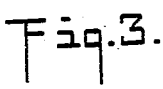
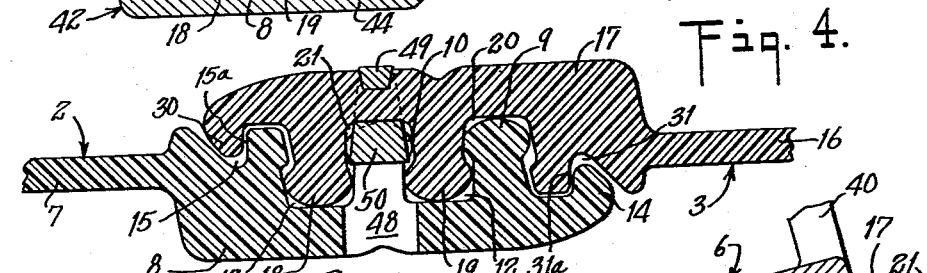
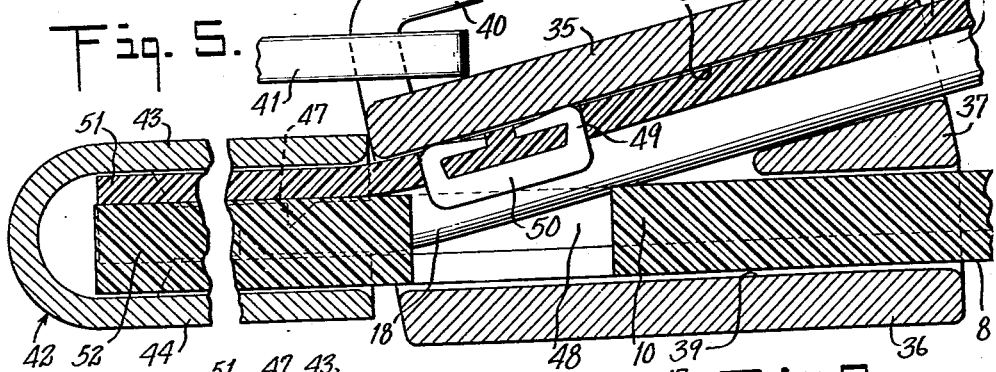
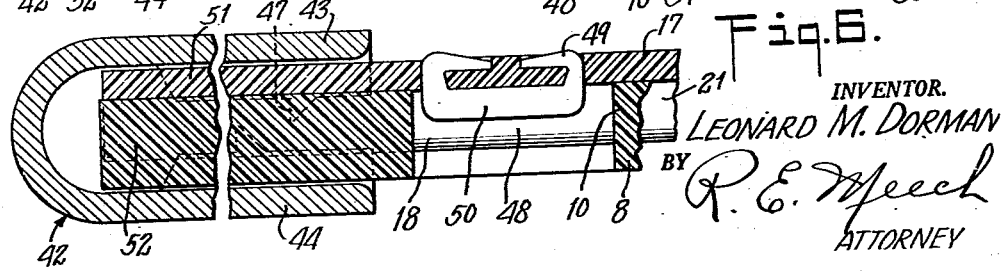
INVENTOR.
LEONARD M. DORMAN
BY
ATTORNEY

United States Patent Office 2,794,227
Patented June 4, 1957

2,794,227

SEPARATING END FOR EXTRUDED FASTENER

Leonard M. Dorman, Meadville, Pa., assignor to Talon, Inc., a corporation of Pennsylvania Application April 28, 1953, Serial No. 351,699

8 Claims. (Cl. 24—201)

This invention relates to fastening devices of the so-called "continuous or extruded type," and particularly to an improved separable end connection for use with such type of fasteners which are adapted to be completely separated at both ends.

The present invention relates to a separable end connection for fasteners, such as slide fasteners of the type consisting of a pair of continuous strips of resilient or flexible material such as rubber, or any suitable plastic material, such as one of the vinyls. These fastener strips are usually formed by extrusion and along the marginal edges of both of the strips, there is provided longitudinally extending ribs or projections and channels with the ribs or tending ribs or projections and channels with the ribs or projections on one strip corresponding to and engaging with the channels in the other strip.

While various types of separable end connections have been heretofore suggested and used for conventional slide fasteners, most of these could not be adapted for use with the continuous or extruded type of fastener of such construction as above described for the reason that the interlocking principle of this type of fastener is entirely different.

Accordingly, it is the general object of the present invention to provide a new and novel separable end connection for fasteners of the continuous or extruded type whereby the strip may be completely separated.

It is another object of the invention to provide a separable end connection for fasteners of the continuous or extruded type in which the ends of strips of the fastener are firmly anchored relative to one another at the ends thereof so as to prevent any longitudinally or lateral movement of the same relative to one another at the said ends.

It is a further object of this invention to provide an improved separable end connection for fasteners of the continuous or extruded type which is simple and inexpensive in its construction and, at the same time, effective and efficient in its use.

It is still another object of the present invention to provide an improved separable end connection for fasteners of the continuous or extruded type which consists of a maximum number of parts which can be easily and inexpensively fabricated and attached to the fastener strips.

Various other objects and advantages of this invention will be more apparent in the course of the following specification, and will be particularly pointed out in the appended claims.

In the accompanying drawings, there is shown for the purpose of illustration, an embodiment which my invention may assume in practice.

In these drawings:

Fig. 1 is a plan view of a slide fastener with which the improved separable end connection of the present invention is incorporated, Fig. 2 is a side elevational view of the fastener shown in Fig. 1, Fig. 3 is an enlarged sectional view taken on line 3—3 of Fig. 2, Fig. 4 is an enlarged sectional view taken on line 4—4 of Fig. 2, Fig. 5 is an enlarged longitudinal sectional view through the separable end connection and slider showing the parts in position for assembling and disassemblying the end connection, and Fig. 6 is an enlarged sectional view taken on line 6—6 of Fig. 1.

Referring more particularly to the drawings, there is shown in Figs. 1 and 2, a fastening device of the continuous or extruded type with which the improved separable end connection of my invention is incorporated. Such a fastener consists of a pair of identical strips 2 and 3 having marginal interlocking portions. These strips 2 and 3 are preferably formed by extrusion from a suitable plastic resinous material, such as one of the vinyls, polyethylene and the like, which have some degree of elasticity. The strip 2 has a flat, thin, relatively thin web portion 7 and a marginal portion 8 which is substantially thicker than the web portion. There is arranged along one side of the marginal portion 8, a pair of spaced-apart longitudinally extending solid rib-like projecting portions 9 and 10, which are parallel to one another and extend continuously the full length of the strip. There is also provided a pair of corresponding longitudinally extending channels 12 and 13 with one channel 12 positioned between the pair of projecting rib-like portions 9 and 10 and with the other channel 13 being positioned on the inner side of the inner projecting portion 10. Along the outer free edge of the marginal portion 8 on the outer side of the outer projecting portion 9, there is arranged a longitudinally extending substantially hook-shaped lip-like portion 14 and along the inner side of the inner channel 13 of the marginal portion 8, there is arranged a relatively shallow groove or channel 15 so as to provide a shoulder 15a.

The strip 3 is identical with the strip 2 and has a flat web portion 16 and a marginal portion 17 which is provided with identical rib-like projecting portions 18 and 19 and identical channels 20 and 21. There is also provided a substantially hook-shaped lip-like portion 30 arranged along the free edge and a relatively shallow groove or channel 31 arranged along the inner wall of the inner channel 20 so as to provide a shoulder 31a. The projections and channels of the respective strips are substantially identical in cross-section so that the projections of one strip will fit into and engage with the channels of the other strip when the marginal edges of the strip are interlocked and the fastener is closed.

Each of the projections 9, 10, 18 and 19 are disposed substantially perpendicular to the planes of the web portions 7 and 16 and have neck portions and an enlarged or bulbous-like head portion. That is to say, the head portion of each rib-like projecting portion is enlarged and the neck portion is constricted to the adjacent complementary channels in the strip alternating in side-by-side relation whereby the channels have a restricted opening thereinto and an enlarged bottom portion.

When the fastener strips 2 and 3 are engaged and interlocked with one another, as more clearly shown in Fig. 4, it will be seen that the projections 9 and 10 of the strip 2 will be disposed in the corresponding channels 20 and 21 of the strip 3 and that the projections 18 and 19 of the latter strip will be disposed in the corresponding channels 12 and 13 of the strip 2 in interlocked relation. It will be understood that the dimensions of the projections and channels are such that when the interlocking portions of the strips are nested, sufficient clearance is provided to enable lengthwise flexing of the interlocked strips without any danger of separation thereof. Also, it will be seen when the marginal edges are in engagement, the hook-shaped portion 14 on the free edge of the marginal portion 8 of the strip 2 lies over the shoulder 31a with the extreme enlarged free end portion disposed in the channel 31 of the strip 3 and that the hook-shaped portion 30 on the free edge of the strip 3 lies over the shoulder 15a with the enlarged extreme edge being disposed in the channel 15 of the strip 2.

There is arranged on the marginal portions of the strips a slider 6 for engaging and disengaging the marginal interlocking portions 8 and 17 of the respective strips 2 and 3, but it will be understood that the strips may be engaged merely by forcing the marginal portions together manually, such as by running the thumb and forefinger along the marginal edges and at the same time forcing the marginal portions together into interlocked relation thereby eliminating the necessity of a slider. The slider shown is of the conventional type for operating this type of fastener and consists generally of a pair of angularly arranged wing portions 35 and 36 joined together by an inclined inner guide wall 37 so as to provide divergent channels 38 and 39 for receiving the marginal portions of the strips. On the outer side of one of the wing portions, there is arranged a lug portion 40 to which a pull member 41 is pivotally attached for manipulating the slider in a well-known manner.

According to the present invention, there is arranged on the end of the strip 2, a socket or retainer 42 which is disposed around the end of the marginal portion 8. This socket member consists preferably of a sheet metal member having substantially a U-shaped cross section, so as to provide spaced-apart walls 43 and 44 having slots 45 and 46 arranged in the flanged side walls thereof. This member 42 is attached by a clamping action to the web portion 7 directly next to the marginal portion 8 thereof by means of barbs 47 or by any other suitable means, with the web portion extending out through the slot 45 in that side of the socket member. The front and rear walls 43 and 44 of this socket member are spaced apart a distance slightly greater than the combined thickness of the marginal portions 8 and 17 when they are in their overlapped interengaged position, as shown in Figs. 5 and 6. Directly above the upper end of the socket member 42, there is arranged in the rib-like projection 10 of the marginal portion 8, a rectangular-shaped recess or aperture 48 for a purpose hereinafter to be described.

Adjacent the lower end of the marginal portion 17 of the strip 3, there is arranged a member 49, preferably in the form of a staple which is securely attached to this marginal portion having a rectangular-shaped portion 50 which projects into the channel 2 therein. This rectangular-shaped projecting portion 50 is slightly smaller than the recess 48 in the marginal portion 8 and is spaced from the end of the strip 2 to which it is attached substantially the same distance as the recess 48 is spaced from the end of the strip 3. This rectangular-shaped projecting portion 50 engages with and co-operates with this recess 48 in a manner to be presently described.

When the fastener is closed and the marginal portions 8 and 17 are interengaged, the lower end portion 51 of the marginal portion 17 is disposed in the socket member or retainer 42 interengaged with the lower end portion 52 of the marginal portion 8. In such position, it will be seen that the rectangular-shaped projecting portion 50 is disposed in the recess 48 of the opposed marginal portion. It is the purpose of the socket member or retainer 42 to house and prevent any relative lateral movement of the end portions 51 and 52 of the marginal portions 17 and 8, respectively, at this end of the fastener and it is the purpose of the projecting portion 50 of the staple member 49 in co-operation with the recess 48 in which it is disposed to prevent any longitudinal movement of these end portions of the strip relative to one another.

This improved separable end connection functions in the following manner. As hereinbefore described, it will be understood that when the fastener is closed, i. e., when the marginal flange portions 8 and 17 are interengaged, the lower end portion 51 of the strip 3 is interengaged with corresponding lower end portion 52 of the strip 3, both of which are housed within the retainer or socket member 42, and the projecting portion 50 of the staple member 49 is disposed in the recess 48, as more clearly shown in Figs. 3 and 6 of the drawings whereby both lateral and longitudinal movement of the strips relative to one another is prevented.

When it is desired to separate the fastener strips, the slider 6 is moved in an opening direction along the strips so as to disengage the marginal edge portions thereof until the slider abuts the inner end of the retainer or socket member 42 which acts as a stop therefor and retains the slider on this strip, as shown in Fig. 5 of the drawings. In such position of the slider it will be seen that the marginal portion 17 of the strip 3 will be moved out of engagement with the marginal portion 8 of the strip 2 and that the projecting portion 50 of the staple member 49 will be moved out of the recess 48 of the opposed strip. With the slider in such position, the marginal end portion 51 of the strip 3 is moved longitudinally relative to the marginal end portion 52 and out of engagement therewith and out of the retainer 42 and out through the channel 38 of the slider so as to completely disengage the strips.

When it is desired to again interengage the strips 2 and 3, the slider 6 is positioned as before against the inner end of the retainer 42. The marginal end portion 51 of the strip 3 is then inserted into and moved longitudinally through the channel 38 and into the retainer 42 into engagement with the marginal end portion 52 disposed therein, as shown in Fig. 5. In such position, the projecting portion 50 of the member 49 again will be disposed opposite the recess 48 in the marginal portion 8 of the strip 2 and upon movement of the slider 6 in a closed direction to interengage the marginal portions 8 and 17, this projecting portion will be moved into and disposed in the recess, as shown in Fig. 6 thereby preventing longitudinal movement of the end portions of the strips relative to one another.

As a result of my invention, it will be seen that there is provided a new and novel separable end connection for fasteners of the continuous or extruded type consisting of a minimum number of parts which can be easily and conveniently fabricated and attached to the fastener stringers or strips. Also, it will be seen that this end connection can be easily assembled and disassembled and at the same time firmly anchors the strips relative to one another when assembled thereby preventing unintentional or accidental disengagement thereof.

While I have shown and described one embodiment which my invention may assume in practice, it will be understood that this embodiment is merely for the purpose of illustration and description, and that other forms may be devised within the scope of my invention as defined in the appended claims.

What I claim as my invention is:

1. In a fastener of the class described adapted to be completely separated at both ends, a pair of flexible strip members, each strip member having a plane web portion and a thickened marginal portion, each marginal portion having longitudinally extending parallel interlocking portions which co-operate and interengage with the marginal portion of the opposed strip when disposed in overlapped relation, a separable end connection comprising means forming a socket attached to the edge of one strip and disposed around the marginal portion at the end thereof, a slot in said socket forming means for receiving the end of the marginal portion of the other strip so as to prevent lateral separation of the marginal portion at said end and to permit said marginal end portion of the other strip to be removed longitudinally through said slot, and means arranged immediately above said socket forming means for anchoring the marginal end portion of said other strip in said socket forming means comprising a member carried by the marginal portion of one of said strips above said socket forming means which projects into an opening arranged in the marginal portion of the other of said strips above said socket forming means.

2. In a fastener of the class described adapted to be completely separated at both ends, the combination as defined in claim 1, wherein the socket forming means consists of a member disposed around the end of the marginal portion of the strip and secured thereto and having substantially a U-shaped cross section so as to provide spaced-apart walls having a recess arranged therebetween for receiving the ends of the marginal portions of said strips in overlapped and interlocked relation, said member having a slot in either side thereof for receiving the web portions of said strips.

3. In a fastener of the class described adapted to be completely separated at both ends comprising a pair of flexible strip members, each strip member having a plane web portion and a thickened marginal portion, said marginal portions being of substantially identical cross section but reversed when in overlapping relation for interengagement, each marginal portion having longitudinally extending parallel channels and rib-like projections alternating with each other, a separable end connection comprising a member disposed around the end of the marginal portion of one of said strips and secured thereto, said member having spaced-apart walls so as to provide a recess therebetween and being substantially U-shaped in cross section, a slot arranged in the outer edge of said member for receiving the web portion of the other of said strips with the marginal portion of said other strip adapted to be disposed in said recess in said member in overlapping relation with said first-mentioned strip, said member adapted to house the marginal end portions of said strips and to prevent lateral separation thereof, and means arranged immediately above said member for preventing longitudinal movement of the marginal portion of one strip relative to the other comprising a projecting member carried by the marginal portion of one of the strips above said separable end member which projects into and engages with an opening in the marginal portion of the other strip above said separable end member.

4. A fastener of the class described adapted to be completely separated at both ends comprising a pair of flexible strip members, each strip member having a plane web portion and a thickened marginal portion, each marginal portion having longitudinally extending parallel interlocking portions which co-operate and interengage with the marginal portion of the opposed strip for interengaging the marginal portion of said strips when disposed in overlapped relation, a slider movable along said marginal portions of said strip members for engaging and disengaging the same, a separable end connection for said strip members comprising a stop member attached to the marginal portion of one of said strip members adjacent the end thereof, a slot in said stop member for receiving the end of the marginal portion of the other strip so as to prevent lateral separation of the marginal portions and to permit said marginal end portion of the other strip to be removed longitudinally through said slot and said slider when said slider is disposed in the vicinity of said stop member, and means arranged immediately above said stop member for preventing passage of said marginal portion out of said slot except when said slider is disposed in the vicinity of said stop member comprising a member carried by the marginal portion of one of said strips above said stop member which projects into an opening arranged in the marginal portion of the other of said strips above said stop member.

5. A fastener of the class described adapted to be completely separated at both ends comprising a pair of flexible strip members, each strip member having a plane web portion and a thickened marginal portion, each marginal portion having longitudinally extending parallel interlocking portions which co-operate and interengage with the marginal portions of the opposed strip for interengaging the marginal portion of said strips when disposed in overlapped relation, a slider movable along said marginal portions of said strip members for engaging and disengaging the same, a separable end connection for said strip members comprising a means forming a socket attached to the edge of one strip and disposed around the marginal portion at the end thereof, the marginal portion at the end of the other of said strips adapted to be inserted longitudinally into said socket in engagement with the marginal portion of the first-mentioned strip disposed therein, and means arranged immediately above said socket forming means for anchoring the marginal portion of said second-mentioned strip member in said socket forming means comprising a member carried by the marginal portion of one of said strips above said stop member which projects into an opening arranged in the marginal portion of the other of said strips above said stop member.

6. A fastener of the class described adapted to be completely separated at both ends comprising a pair of flexible strip members, each strip member having a plane web portion and a thickened marginal portion, said marginal portions being of substantially identical cross section but reversed when in overlapping relation for interengagement, each marginal portion having longitudinally extending parallel channels and rib-like projections alternating with each other, a slider arranged on said marginal portions and movable therealong for engaging and disengaging the same, and a separable end connection comprising a socket member attached to the end of one of said strip members and disposed around the marginal portion at the end thereof, the marginal portion at the end of the other strip member disposed in said socket member when the marginal portions of the strip members member are interengaged and adapted to be removed longitudinally therefrom through said slider when said slider is in the vicinity of said socket member and the strip members are disengaged, and means arranged immediately above said socket member for normally anchoring the marginal portion of said last-mentioned strip member in said socket member comprising a projecting portion arranged in the channel of one of said strip members along the marginal portion thereof at a point above said socket member which co-operates with an opening arranged in the opposed rib-like projection of the marginal portion of the other strip above said socket member.

7. A fastener of the class described adapted to be completely separated at both ends, as defined in claim 6, wherein the socket member consists of a member disposed around the end of the marginal portion of the strip and secured thereto and having substantially a U-shaped cross section so as to provide spaced-apart walls having a recess arranged therebetween for receiving the ends of the marginal portions of said strips in overlapped and interlocked relation, said member having a slot in either side thereof for receiving the web portions of said strips.

8. A fastener of the class described adapted to be completely separated at both ends comprising a pair of flexible strip members, each strip member having a plane web portion and a thickened marginal portion, said marginal portions being of substantially identical cross section but reversed when in overlapping relation for interengagement, each marginal portion having at least a pair of longitudinally extending parallel channels and at least a pair of corresponding rib-like projections alternating with each other, a slider arranged on said marginal portions and movable therealong for engaging and disengaging the same, and a separable end connection comprising a substantially U-shaped socket member attached to the end of one of said strip members and disposed around the marginal portion at the end thereof, the marginal portion at the end of the other strip member disposed in said socket member when the marginal portions of the strip members are interengaged and adapted to be removed longitudinally therefrom through said slider when said slider is in the vicinity of said socket member, and the strip members are disengaged and means arranged immediately above said socket member for normally anchoring the marginal portion of said last-mentioned strip member in said socket member which consists of a projecting member arranged in the outermost channel of said last-mentioned strip at a point above said socket member which co-operates with an opening formed in the opposed rib-like projection of the marginal portion of the other strip at a point above said socket member.

References Cited in the file of this patent

UNITED STATES PATENTS

| | | |
|---|---|---|
| 1,929,083 | Sipe | Oct. 3, 1933 |
| 1,959,319 | Sipe | May 15, 1934 |
| 2,154,099 | Marinsky | Apr. 11, 1939 |
| 2,613,421 | Madsen | Oct. 14, 1952 |

FOREIGN PATENTS

| | | |
|---|---|---|
| 49,722 | Netherlands | Dec. 16, 1940 |
| 507,101 | Belgium | Nov. 30, 1951 |
| 733,472 | Germany | Feb. 23, 1944 |